United States Patent [19]
Diaz et al.

[11] Patent Number: 5,920,353
[45] Date of Patent: Jul. 6, 1999

[54] MULTI-STANDARD DECOMPRESSION AND/OR COMPRESSION DEVICE

[75] Inventors: Raul Zegers Diaz, Palo Alto; Jeyendran Balakrishnan, Sunnyvale; Jefferson Eugene Owen, Fremont, all of Calif.

[73] Assignee: ST Microelectronics, Inc., Carrollton, Tex.

[21] Appl. No.: 08/758,779

[22] Filed: Dec. 3, 1996

[51] Int. Cl.[6] .................................................... H04N 7/50
[52] U.S. Cl. .......................... 348/402; 348/413; 348/416
[58] Field of Search ................................... 348/415, 401, 348/402, 412, 413, 416

[56] References Cited

U.S. PATENT DOCUMENTS

| | | | |
|---|---|---|---|
| 4,328,557 | 5/1982 | Gastinel | 345/507 |
| 5,264,936 | 11/1993 | Meunier | 348/728 |
| 5,400,078 | 3/1995 | Maldonado et al. | 348/558 |
| 5,459,519 | 10/1995 | Scalise et al. | 348/431 |
| 5,608,459 | 3/1997 | Hashimoto | 348/416 |
| 5,706,290 | 1/1998 | Shaw | 348/390 |
| 5,717,461 | 2/1998 | Hoogenboom | 348/411 |
| 5,774,206 | 6/1998 | Wasserman | 348/416 |

Primary Examiner—Howard Britton
Attorney, Agent, or Firm—David V. Carlson; Theodore E. Galanthay; Lisa K. Jorgenson

[57] ABSTRACT

Circuits and methods for subdividing a decoder into functional blocks that can be accessed separately. The decoder includes a decoder module having a parser, a block decoder and a motion compensation engine, which can all be further subdivided into functional blocks. The functional blocks can be bypassed in decompressing frames where the blocks are not necessary, or when the compression algorithm does not require the functional block, increasing the speed of the decoder. The functional blocks can also be reused for decompression or compression based on different standards, or for different operation in the decoder, such as decompression and compression. The decoder can be coupled to a processor and some of the functional block performed in the decoder's hardware and some are performed in the processor. In one embodiment of the invention and the processor determines which block are to be by-passed completely and which block are to be performed in software based on the decompression protocol to which the compressed frame is encoded to comply to, the capacity and speed of the processor, and the available memory. In another embodiment multiplexers can be added to the decoder to connect functional blocks so they can be by-passed or reused based on preprogramming of the multiplexers based on the decompression protocol to which the compressed frame is encoded to comply to, the capacity and speed of the processor, and the available memory.

51 Claims, 6 Drawing Sheets

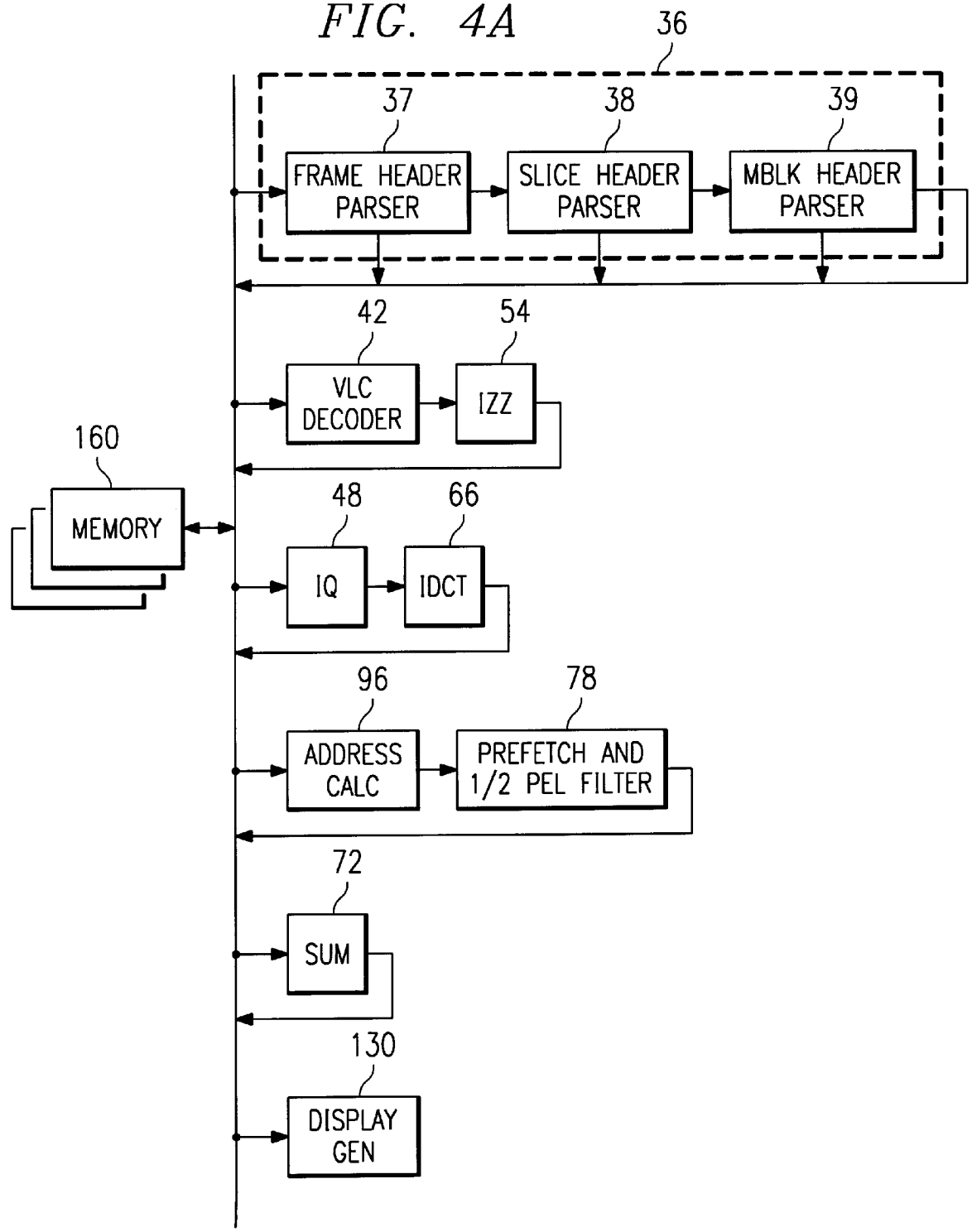

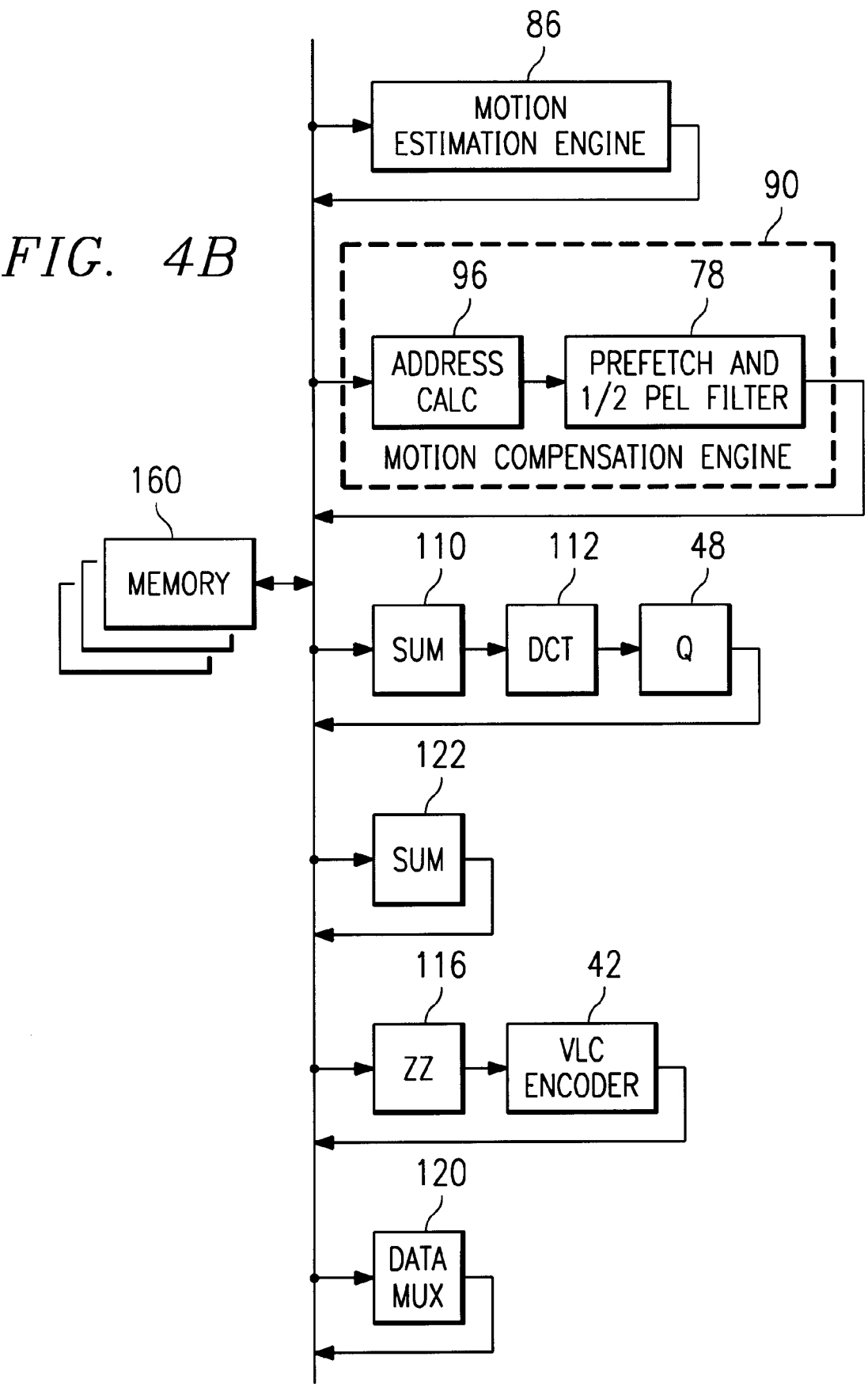

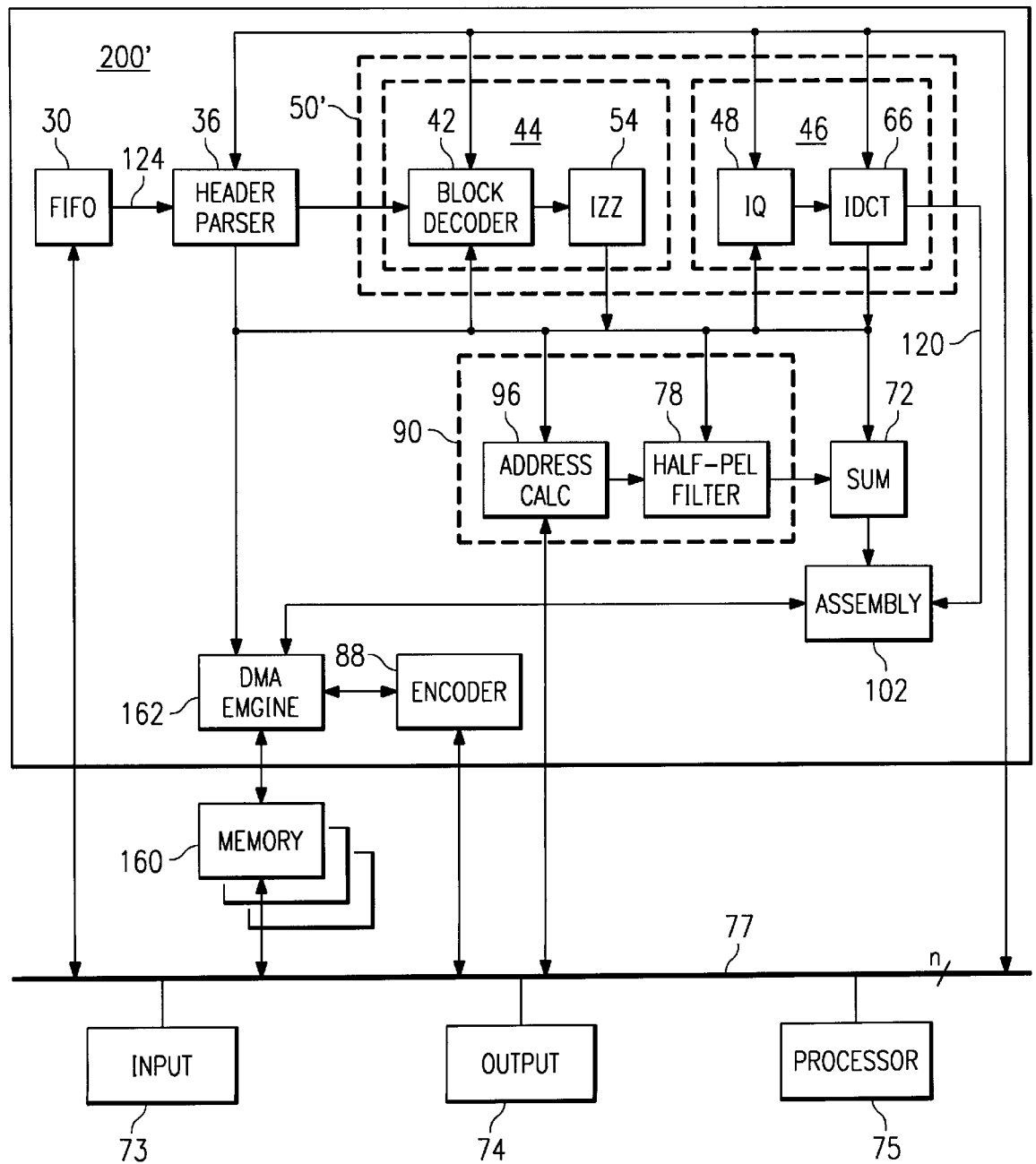

MULTI-STANDARD DECOMPRESSION AND/OR COMPRESSION DEVICE

BACKGROUND

The present invention relates to the field of video and/or audio decompression and/or compression devices, and is more specifically directed to a decompression and/or compression device capable of decoding a bitstream encoded to comply to one of several decompression protocols and/or encoding a bitstream to comply to one of several decompression protocols.

The size of a digital representation of uncompressed video images depends on the resolution and color depth of the image. A movie composed of a sequence of uncompressed video images, and accompanying audio signals quickly becomes too large to fit entirely onto conventional recording medium, such as a compact disk (CD). Moreover, transmitting such an uncompressed movie over a communication link is prohibitively expensive because of the excessive quantity of data to be transmitted.

It is therefore advantageous to compress video and audio sequences before they are transmitted or stored. A great deal of effort is being expended to develop systems to compress these sequences. There are several coding standards currently used that are based on the DCT algorithm including MPEG-1, MPEG-2, H.261, and H.263. (MPEG is an acronym for "Motion Picture Expert Group", a committee of the International Organization for Standardization, ISO.) The MPEG-1, MPEG-2, H.261 and H.263 standards include decompression protocols that describe how an encoded (i.e. compressed) bitstream is to be decoded (i.e. decompressed). The encoding can be done in any manner, as long as the resulting bitstream complies with the standard.

Video and/or audio compression devices (hereinafter encoders) are used to encode the video and/or audio sequence before the sequence is transmitted or stored. The resulting encoded bitstream is decoded by a video and/or audio decompression device (hereinafter decoder) before the video and/or audio sequence is output. However, a bitstream can only be decoded by a decoder if it complies with the standard used by the decoder. To be able to decode the bitstream on a large number of systems, it is advantageous to encode the video and/or audio sequences according to a well accepted encoding/decoding standard. The MPEG standards are currently well accepted standards for one way communication. H.261, and H.263 are currently well accepted standards for two way communication, such as video telephony.

Once decoded, the decoded video and audio sequences can be output on an electronic system dedicated to outputting video and audio, such as a television or a video cassette recorder (VCR), or on an electronic system where image display and audio is just one feature of the system, such as a computer. A decoder needs to be added to these electronic systems to allow them to decode the compressed bitstream into uncompressed data, before it can be output. An encoder needs to be added to allow such electronic systems to compress video and/or audio sequences that are to be transmitted or stored. Both the encoder and decoder need to be added for two way communication.

FIG. 1A shows a block diagram of the architecture of a typical decoder, such as an MPEG-2 decoder 10. The decoder 10 can be both a video and audio decoder or just a video decoder, where the audio portion of the decoder 10 can be performed in any known conventional way. The encoded bitstream is received by an input buffer, typically a first-in-first-out (FIFO) buffer 30, hereinafter FIFO 30, although the buffer can be any type of memory. The FIFO 30 buffers the incoming encoded bitstream as previously received data is being decoded.

The encoded bitstream for video contains compressed frames. A frame is a data structure representing the encoded data for one displayable image in the video sequence. This data structure consists of one two-dimensional array of luminance pixels, and two two-dimensional arrays of chrominance samples, i.e., color difference samples.

The color difference samples are typically sampled at half the sampling rate of the luminance samples in both vertical and horizontal directions, producing a sampling mode of 4:2:0 (luminance:chrominance:chrominance). Although, the color difference can also be sampled at other frequencies, for example one-half the sampling rate of the luminance in the vertical direction and the same sampling rate as the luminance in the horizontal direction, producing a sampling mode of 4:2:2.

A frame is typically further subdivided into smaller subunits, such as macroblocks. A macroblock is a data structure having a 16×16 array of luminance samples and two 8×8 of adjacent chrominance samples. The macroblock contains a header portion having motion compensation information and 6 block data structures. A block is the basic unit for DCT based transform coding and is a data structure encoding an 8×8 sub array of pixels. A macroblock represents four luminance blocks and two chrominance blocks.

Both MPEG-1 and MPEG-2 support multiple types of coded frames: Intra (I) frames, Forward Predicted (P) frames, and Bidirectionally Predicted (B) frames. I frames contain only intrapicture coding. P and B frames may contain both intrapicture and interpicture coding. I and P frames are used as reference frames for interpicture coding.

In interpicture coding, the redundancy between two frames is eliminated as much as possible and the residual differences, i.e. interpicture prediction errors, between the two frames are transmitted, the frame being decoded and a prediction frame. Motion vectors are also transmitted in interpicture coding that uses motion compensation. The motion vectors describe how far, and in what direction a macroblock has moved compared to a prediction macroblock. Interpicture coding requires the decoder 10 to have access to the previous and/or future images, i.e. the I and/or P frames, that contain information needed to decode or encode the current image. These previous and/or future images need to be stored and then used to decode the current image.

Intrapicture coding for I frames involves the reduction of redundancy between the original pixels in the frame using block based DCT techniques, although other coding techniques can be used. For P and B frames, intrapicture coding involves using the same DCT based techniques to remove redundancy between the interpicture prediction error pixels.

The output of the FIFO 30 is coupled to a macroblock header parser 36. The header parser 36 parses the information into macroblocks, and then parses the macroblocks and sends the header portion of each macroblock to an address calculation circuit 96. The address calculation circuit 96 determines the type of prediction to be performed to determine which prediction frames the motion compensation engine 90 will need to access. Using the motion vector information, the address calculation circuit 96 also determines the address in memory 160 where the prediction frame, and the prediction macroblock within the frame, that is needed to decode the motion compensated prediction for the given macroblock to be decoded, is located.

The prediction macroblock is obtained from memory 160 and input into the half-pel filter 78, which is coupled to the address calculation circuit 96. Typically there is a DMA engine 162 in the decoder that controls all of the interfaces with the memory 160. The half-pel filter 78 performs vertical and horizontal half-pixel interpolation on the fetched prediction macroblock as dictated by the motion vectors. This obtains the prediction macroblocks.

As explained earlier, pixel blocks in I frames and prediction error pixel blocks in P or B frames are encoded using DCT based techniques. In this approach, the pixels are transformed using the DCT into DCT coefficients. These coefficients are then quantized in accordance with quantization tables. The quantized DCT coefficients are then further encoded as variable length Huffman codes to maximize efficiency, with the most frequently repeated values given the smallest codes and increasing the length of the codes as the frequency of the values decreases. Although codes other than the Huffman codes can be used depending on the decompression protocol. The coefficients are ordered in a rectangular array format, with the largest value in the top left of the array and typically decreasing in value to the right and bottom of the array. To produce a serial data bitstream the array is re-ordered. The order of the serialization of the coefficients is in a zig-zag format starting in the top right corner of the array, i.e if the array is thought of in a matrix format the order of the elements in zig-zag format is 11, 12, 21, 31, 22, 13, 14, etc., as shown in FIG. 1B. The quantization can be performed either before or after the zig-zag scan.

Referring again to FIG. 1A, the header parser 36 sends the encoded block data structures to a variable length code (VLC) decoder 42. The VLC decoder 42 decodes variable length codes representing the encoded blocks and converts them into fixed length pulse code modulation (PCM) codes. These codes represent the DCT coefficients of the encoded blocks. The PCM codes are a serial representation of the 8×8 block array obtained in a zig-zag format. The inverse zig-zag scanner 54, connected to the VLC decoder 42, converts the serial representation of the 8×8 block array obtained in a zig-zag format to a rectangular 8×8 block array, which is passed to the inverse quantizer 48. The inverse quantizer 48 performs the inverse quantization based on the appropriate quantization tables and the passes that to the IDCT circuit 66. The IDCT circuit 66 performs the inverse DCT on its input block and produces the decompressed 8×8 block. The inventors have found that these circuits can be broken down into functional blocks. In current technology the decoder is typically integrated on one or several chips without being grouped into functional blocks.

The prediction macroblock and the interpicture prediction errors are summed in the summing circuit 72 and passed to the assembly unit 102. Because in interpicture compression some frames require access to future frames to be decoded, the required frames should be sent before the frame that requires them. In the MPEG-2 standard, because frames can require both past and future frames for decompression, and therefore the compressed frames are not sent in the same order that they are displayed in the video sequence. The assembly unit 102 ensures that the information is placed in the correct place in memory to correspond to the frame being decompressed. The resulting decoded macroblock now needs to be stored in the memory 160 in the place designated for in by the assembly unit 102. All frames need to be stored in memory 160 because the decoded macroblock may not be the next macroblock that is to be sent to the display due to the storing and transmission format of the decompression protocol. In MPEG-2 and other decompression protocols that use interpicture compression, the frames are encoded based on past and future frames, therefore in order to decode the frames properly the frames are not sent in order and need to be stored until they are to be displayed. A typical MPEG-2 decoder 10 requires 16 Mbits of memory to operate in the main profile at main level mode (MP at ML). This means that the decoder requires a 2 Mbyte memory 160.

The decoder 10 can be designed to decode a bitstream formatted according to any one or a combination of standards. To decode a bitstream formatted according to a combination of standards, the decoder 10 needs to include circuitry for decoding bitstreams according to each decompression protocol. This circuitry is specific to the particular decompression protocol. The decoder 10 would also need separate encoding circuitry in order to encode a bitstream to comply to a particular decompression protocol. The decoder 10 is simply a combination of decoders, and possibly encoders, for each desired decompression protocol. For example, a decoder 10 that can decompress a bitstream encoded to comply to either the MPEG-2 standard or the H.261 standard contains two sets of decoding circuitry with each set containing its own motion compensation circuits, its own block decoding circuits, one for each of the standards and specific to that particular standard. If it is also desired that the decoder 10 be able to encode an image sequence to comply to a particular decompression protocol, separate encoding circuitry that contains circuits specific to encoding a sequence to comply to that particular decompression protocol also needs to be added.

This need for separate sets of circuitry is a problem because it greatly increases the die area of the decoder. A long time goal in the semiconductor industry has been to reduce the die area of an integrated circuit device for a given functionality. Some advantages of reducing the die area are the increase in the number of die that can be manufactured on same size silicon wafer, and the reduction in price per die resulting therefrom. This results in both an increase in volume and reduction in price of the device. Increasing the die area presents a problem because it drastically increases the cost of the device.

This is an encouragement to keep the number of decompression standards added to the device to a minimum to try and contain the increase in the die area. However, it is advantageous for the decoder 10 to be able to decode and encode sequences formatted to comply to several well accepted standards. This allows the decoder 10 to be able to decode a large number of video and/or audio sequences. Additionally, for video telephony the decoder 10 must be able to decode and encode sequences, therefore needing both a decoder and encoder.

There is now a wealth of images available, many of which comply to different standards. There is also a desire to be able to both receive transmitted or stored images, which are typically encoded to comply to the MPEG-1 or MPEG-2 standards, and to be able to communicate using video telephony, in which the images of the participants are typically encoded to comply to the H.261 or H.263 standards. This makes it advantageous to put a decoder capable of doing both into a computer, or another similar device. However, this flexibility, which is becoming more and more demanded by the consumer, is coming at the price of a much higher die area for the device and a greatly increased cost of building such a decoder.

SUMMARY OF THE INVENTION

The present invention provides circuitry and methods of operation of a multi-standard decoder. The decoder includes a parser, for parsing the compressed frame and separating motion compensation information and block data structures in the compressed frame. The decoder also includes a block decoder module for decoding pixels and interpicture prediction errors in the block data structures, a motion compensation engine for obtaining a prediction macroblock using the motion compensation information, and a summing circuit for summing decoded intrapicture prediction errors and decoded motion compensation prediction errors. The block decoder and motion compensation engine can be accessed separately.

In another embodiment the block decoder and motion compensation engine can be further broken down into modules that can be accessed separately.

An advantage of the present invention is that the die area and cost of the circuit can be reduced because functional circuitry can be reused in for different operations of the decompression and for different standards, reducing the circuitry need to perform the decompression of a compressed frame.

A further advantage of the present invention is that when the decoder is connected to a processor some, or parts of some, of the functional blocks of the decoder can be performed in the processor, allowing the decoder to decompress more than one frame concurrently.

Another advantage of the present invention is that when the decoder is connected to a processor some, or parts of some of the functional blocks of the decoder can be performed in the processor, allowing the decoder to decompress a compressed frame and compress a decompressed frame concurrently.

A further advantage of the present inventions is that the dynamic reconfiguration in the processor of what parts of the decompression of a frame are performed in the processor and what are performed in the decoder's hardware provide the additional advantage of taking into effect any modification in the electronic system, such as replacement of the processor with a more powerful one or the addition of memory, and the advantage of being able to accommodate future decoding standards that use most the of same functional blocks as the standards the decoder is originally designed for, with just a modification to the software.

Other advantages and objects of the invention will be apparent to those skilled in the art having reference to the following specification together with the drawings.

BRIEF DESCRIPTION OF THE DRAWINGS

FIGS. 4A and 4B are flowcharts of the operation of the decoder in FIG. 3.

FIG. 5 is an electrical diagram, in block form, of a computer containing a decoder according to the embodiment of the invention shown in FIG. 3.

DETAILED DESCRIPTION OF THE PREFERRED EMBODIMENT

Figure 1A:
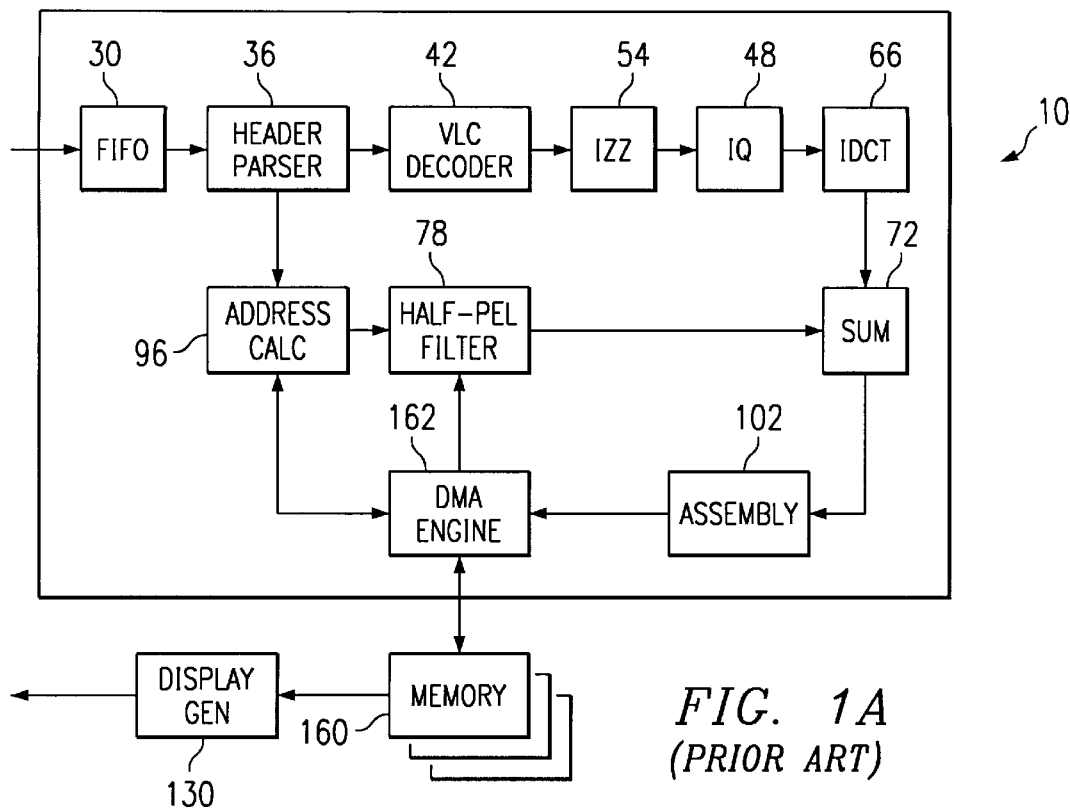
FIG. 1A is an electrical diagram, in block form, of the architecture of a typical decoder.
Figure 1B:
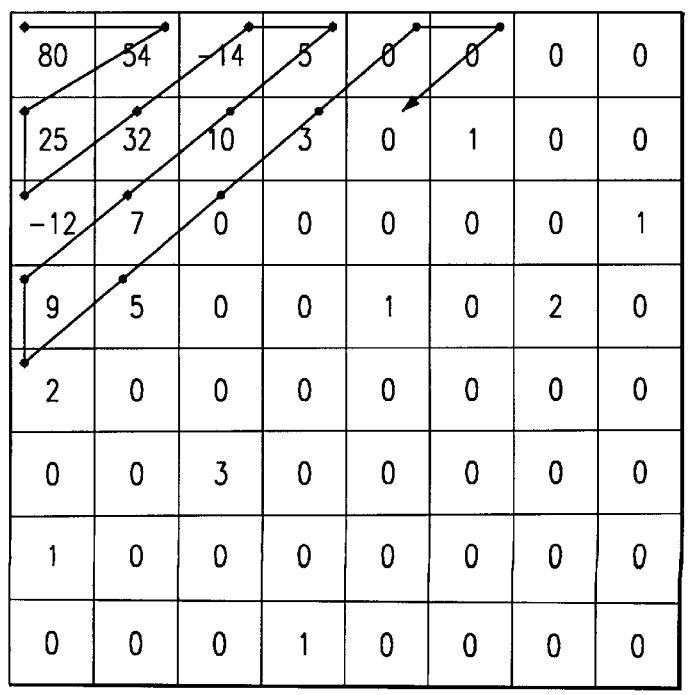
FIG. 1B is a example of a zig-zag scan.
Figure 2:
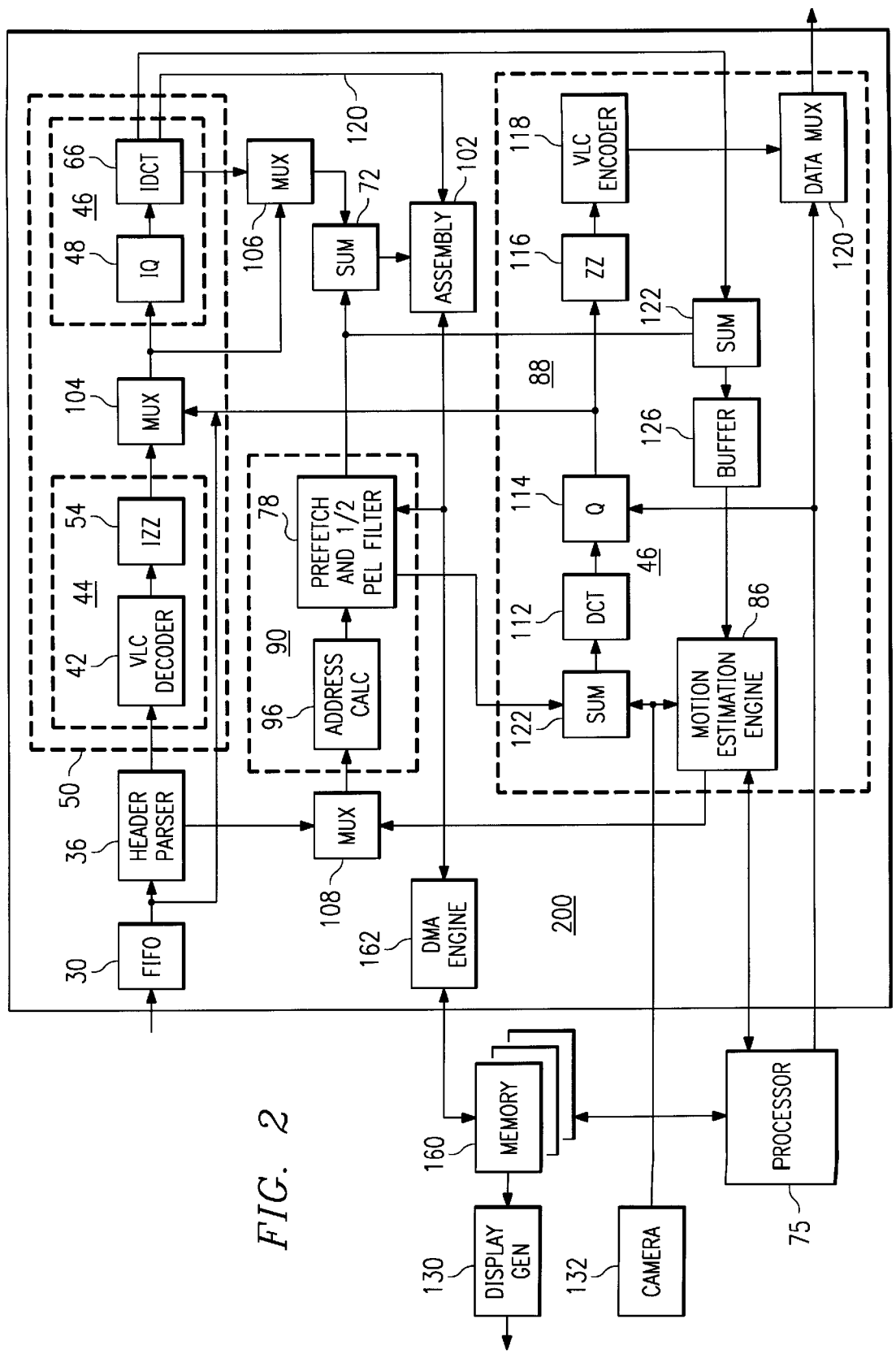
FIG. 2 is an electrical diagram, in block form, of the architecture of a decoder according to an embodiment of the invention.

FIG. 2 shows a block diagram of the architecture of a decoder 200 according to an embodiment of the invention.

Parts common to FIGS. 1 through 5 are indicated using the same numbering system. The decoder 200 is a multi-standard decoder in that it can decode input that is encoded in any of a number of different formats. The standards can be any standards which use both intrapicture and interpicture compression, such as a MPEG-2, MPEG-1, H.261, H.263. Using the present invention, greater reduction in die area of the decoder is typically obtained when the standards the decoder complies to are all based on the same underlying algorithm, as opposed to different algorithms. FIG. 2 specifically shows a decoder 200 that uses the discrete cosine transform (DCT) to decompress frames, although a decoder that uses different decoding techniques can be used. The decoder 200 can be a video or audio, or a combination video and audio decoder.

The decoder 200 can decode a bitstream formatted according to a combination of standards. In the preferred embodiment of the invention the decoder 200 is a multi-standard decoder capable of decoding bitstreams formatted to comply to several well accepted DCT standards. In the embodiments shown in FIGS. 2 and 3 the decoder 200 is capable of decoding bitstreams that comply to MPEG-1, MPEG-2, H.261, and H.263. This allows the decoder 200 to be able to decode a large number of video and/or audio sequences. In the embodiment of the invention shown in FIGS. 2 and 3 the decoder is also capable of encoding a sequence to comply to the H.261 and H.263 standards to allow the decoder 200 to be used for video telephony. The choice of which standards the decoder 200 is capable of decoding bitstreams formatted to, and of encoding sequences to comply to is based on the desired cost, efficiency, and application of the decoder 200.

The decoder 200 is composed of functional blocks or modules. There are connections between the functional blocks that allow each of the functional blocks to be accessed by one or several of the other functional blocks. In the embodiment shown in FIG. 2, multiplexers (MUXs) are placed between functional blocks that are to be accessed by more than one module. The decoder 200 contains a buffer, a FIFO 30. The FIFO 30 is like the FIFO found in conventional decoders and is used to buffer the incoming compressed data as previously received compressed data is being decoded. The FIFO 30 is coupled to the header parser 36. The header parser 36 is like the header parser found in a conventional decoder and serves to parse the encoded data into macroblocks and extract the motion compensation information from the header of the macroblocks.

The first output of the header parser 36 is coupled to the VLC decoder 42 of a block decoder module 50. The block decoder module 50 contains a block array module 44 and an IDCT module 46. The VLC decoder 42 is coupled to the inverse zig-zag scanner (IZZ) 54. The output of the IZZ 54 is coupled to an input of a MUX 104. The output of the FIFO 30 is also coupled to an input of the MUX 104, to enable the compressed data stored in the FIFO 30 to by-pass the parser 36 and block array module 44 to go directly to the MUX 104. The select input of the MUX 104, as well as any other MUXs in the decoder that are used to form connections between functional blocks, is pre-programmed logic circuitry, such as a processor or microcontroller. The pre-programmed logic circuitry is programmed to compare what is the next operation that is to be performed to the functional blocks to which the output of the MUX is connected. The output of the MUX 104 is connected to the input of the inverse quantizer 48 of the IDCT module 46. The inverse quantizer 48 is coupled to the IDCT circuit 66. The output of the IDCT circuit 66 is coupled to the MUX 106. The output of MUX 104 is the other input of the MUX 106 to by-pass the IDCT module 46. The MUXs serve as a connection between functional blocks to allow one functional block to access several different functional blocks based on the decoding or encoding operation to be performed next. MUX 106 in combination with MUX 104 by-pass the entire block decoder module 50. In a non-DCT based decoder the decoder module would contain circuits to decode the information based on the non DCT algorithm used instead of the block array decoder module 44 and the IDCT module 46. The block decoder module 50, block array module 44 and the IDCT module 46 can be structured as a pipeline. The block decoder module 50 decodes both pixels and interpicture prediction errors.

The second output of the parser 36 is coupled to the address calculation circuit 96 of the motion compensation engine 90 through MUX 108, although the MUX can be removed when the encoder is not present, or will not be accessing the motion compensation engine. The address calculation circuit 96 is connected to the half-pel filter 78. The memory 160 is coupled to the half-pel filter 78 of the motion compensation engine 90. The output of the motion compensation engine 90 and the output of the block decoder module 50 are summed in the summing circuit 72. The result is passed to the assembly unit 102. The output of the assembly unit 102 is the output of the decoder 200. The output of the decoder 200 is coupled to a display generator 130, typically through the memory 160. The decoder can also contain other blocks depending on the electronic system in which the decoder is designed to operate.

An encoder module 88 is coupled to the memory 160, although the decoder 200 can operate without the encoder module. As mentioned above, the encoder module 88 encodes a sequence of data to comply with the H.261 and H.263 standards for video telephony. The encoder module should be added when it is decided that the decoder 200 be able to process sequences for video telephony.

For video telephony and teleconferencing each end user has to be able to both receive and transmit. H.261, and H.263 are currently well accepted standards for video telephony. An encoder that can encode sequences to comply to the H.261 and H.263 standards is less complicated, having a lower resolution and lower frame rate than an encoder that complies to the MPEG-1 or MPEG-2 standards, possibly making the quality of the decoded images somewhat lower than those from an encoder that complies with the MPEG-1 or MPEG-2 standards. Such an encoder should be inexpensive and operate in real time. This typically makes it less efficient than an encoder to encode sequences to comply to the MPEG-1 or MPEG-2 standards. Meaning that the compression factor, which is the ratio between the source data rate and the encoded bitstream data rate, of such an encoder is lower for a given image quality than the compression factor of an MPEG encoder. However, because such an encoder is less complicated it is much cheaper and faster than an encoder capable of complying with the MPEG-1 and/or MPEG-2 standards. This makes video telephony possible, since both a long delay in encoding the signal and a cost that is prohibitively expensive for many users is unacceptable in video telephony.

In the embodiment shown in FIG. 2, the decoder 200 is capable of decoding a bitstream formatted to comply to the MPEG-1, MPEG-2, H.261, and H.263 standards, and encoding a sequence to produce a bitstream to comply to the H.261, and H.263 standards. This allows the decoder 200 to be able to be used for video telephony. The encoding to comply to the H.261 and H.263 standards but not the MPEG-1 and MPEG-2 balances the desire to reduce the cost of transmission and storage by encoding to produce the highest compression factor and the desire to keep cost low enough to be able to mass market the device.

The encoder module 88 has an input for receiving the incoming frames. Each macroblock in the incoming frame, hereinafter incoming macroblock, goes to a summing circuit 110 and a motion estimation engine 86. When the decoder 200 is coupled to a processor 75 the motion estimation can be performed by the decoder hardware or by the processor 75 in software, or preferably a combination of the two. The motion estimation module 86 compares the incoming macroblock with macroblocks in future and past frames to determine which macroblock, and in which frame, i.e. an I or P frame, with which it has the most in common. The macroblock it has the most in common with is the prediction macroblock for this incoming macroblock. The motion estimation engine 86 determines the motion vectors between the incoming macroblock and the prediction macroblock. The motion vectors determined in the motion estimation engine 86 are an input of the data MUX 120 and an input of the motion compensation engine 90. The motion compensation engine 90 gets the prediction macroblock. The output of the motion compensation engine 90 is an input of a summing circuit 122 and an input of the summing circuit 110. The motion compensation engine 90 of the decoder 200 can be used in the encoder module through MUX 108, although when the decoder 200 is coupled to a processor, the processor and the memory can be used to instead of the MUX 108, as described further on. Using the motion compensation engine 90 that is already in the decoder 200 for the motion compensation engine needed in the encoder 88 allows the encoder module 88 to reuse the motion compensation engine 90 saving the die space that would be needed for the additional motion compensation engine.

The prediction macroblock is subtracted from the incoming macroblock in the summing circuit 110. When there is no prediction marcoblock, such as when the frame is an I frame, nothing is added to the pixels of the incoming macroblock. When there is a prediction macroblock, the pixels of the incoming prediction macroblock are subtracted from the pixels of the incoming macroblock to obtain the prediction error pixels for the incoming macroblock.

The output of the summing circuit is connected to a DCT circuit 112, which is connected to a quantizer 114. The DCT circuit 112 performs the DCT on each 8×8 block of pixels in the input frame. The quantizer 114 quantizes the values based on the appropriate quantization tables. The output of the quantizer 114 is connected to a zig-zag scanner (ZZ) 116 and to the IDCT module 46 through the MUX 104. If the incoming macroblock can serve as a prediction marcoblock, such as macroblocks in I and P frames, it is sent to the IDCT module 46 and then to a buffer to be retrieved when it is a prediction macroblock for some incoming macroblock.

When the incoming macroblock is encoded it is quantized. There is always some loss when data is quantized. The decoder will be decoding the macroblock by adding the prediction errors to a prediction marcoblock that was quantized. There would be less error if the prediction errors obtained in the encoder are also based on a prediction macroblock that has been quantized. Therefore any incoming macroblock that can be used as a prediction macroblock goes through the quantizer 114 and the inverse quantizer 48 before it is stored. Therefore, The encoder module 88 needs an inverse quantizer and an IDCT circuit to decompress these macroblocks. Connecting the motion estimation module 86 to the MUX 104 allows the encoder module 88 to use the same IDCT module 46 as used by the block decoder module 50. Allowing the encoder module 88 to use the same IDCT module 46 permits the encoder module 88 to perform the decoding of macroblocks to be compared in hardware, speeding up the decompression, without the addition of any circuits and the accompanying die space.

The output of the IDCT module 46 is an input of a summing circuit 122. As described above, the output of the motion compensation engine 90 is also an input of a summing circuit 122. The prediction macroblock is added in the sum circuit 122 to the prediction errors decoded by the IDCT circuit 66, when there is a prediction macroblock, to obtain the uncompressed incoming macroblock. The output of the summing circuit 122 is stored in a buffer 126. The buffer is typically a FIFO, although the buffer can be a part of the main memory. The macroblocks in the I and P frames are stored in the buffer 126 and retrieved when they are the prediction macroblocks needed for the comparison. The buffer 126 is connected to the motion estimation engine 86.

As described above, the output of the quantizer 114 is also connected to the ZZ 116. The ZZ 116 converts 8×8 rectangular block arrays of the incoming frame into a serial representation of it in a zig-zag format. The ZZ 116 is connected to the VLC encoder 118, which is connected to the data MUX 120. The VLC encoder 118 then encodes the fixed length PCM codes that represent the DCT coefficients of the encoded blocks into VLC, typically using Huffman codes. This combined with header information, typically obtained from the processor forms the encoded bitstream. The operation of the data MUX 120, like most of the other functional blocks can be performed by the processor 75. The encoded bitstream is the output of the data MUX 120, which is also the output of the encoder module 88.

The encoder module 88 is controlled by logic circuitry. When the decoder 200 is coupled to a processor 75, the processor controls the encoder module 88. Although the encoder 88 can have its own small processor, such as a microcontroller.

In one embodiment of the invention, the decoder 200 is also coupled to a processor 75. The processor 75 allows some or parts of some, of the functional blocks to be performed in software in the processor 75 to either completely replace some, or part of some, of the functional blocks or to allow the function to be performed in either hardware or software. Completely replacing some or parts of some of the functional blocks that are not too exhaustive to be performed in software, such as the majority of the motion estimation block for H.261 and H.263 allows for a saving in die space and reduces the cost of the system, while keeping the most exhaustive functional blocks in hardware so that they can be performed fast enough for the system to operate in real time. Operating in real time means that the decoder 200 has to operate fast enough to decode the entire image in the time between screen refreshes, which is typically $\frac{1}{30}$ of a second, with the human viewer not being able to detect any delay in the decoding. A goal is to have the decoder 200 operate in real time without dropping so many frames that it becomes noticeable to the human viewer. If the decoder 200 does not operate in real time in decoding a movie, the decoded movie would stop and wait periodically between images until the decoder 200 can get access to the memory to process the next image. If the decoder contains the encoder to allow for video telephony, not operating in real time would mean that the length of time between the occurrence of an event, such as speaking, at one end of the conversation until the event is displayed at the other end of the conversation is increased by the time both the encoder and then the decoder must wait to get access to the bus and the main memory. There would be gaps in the conversation until the equipment can catch up. This increases the time needed to have a video conference, and makes the conference uncomfortable for the participants.

How much of the operation is performed in the processor 75 is based on balancing the processing capacity and speed of the processor 75 with the complexity and amount of processing required to perform the function as specified by the standard to which the encoded bitstream complies in real time. The processor's processing capacity and speed should at or above the capacity and speed needed for the processor to perform the function fast enough to allow the decoder 200 to decoded the frame in the time between screen refreshes, typically $\frac{1}{30}$ of a second. The determination of whether the processor's capacity and speed are above the capacity and speed needed for a particular standard is the requirements of that standards, the time required by the decoder to decompress a frame complying to that standard, the memory requirement to perform the decompression, the memory available to the processor, and the capabilities of the processor. The MUXs are programmed based on this information and should receive the to which standard, i.e. MPEG-2, H.263, etc., the frame complies. This way the decoder can dynamically determine if a function can be performed in software or hardware based on the standard to which the compressed frame complies to and the capabilities of the system the decoder is in.

Separating the decoder into functional block and connecting it to a processor allows some, or portions of some, of the functional block to be performed by the processor, freeing up the hardware for other tasks and allowing the decoder 200 to perform more functions concurrently.

In operation, the I or P frames needed to decompress the compressed frame, i.e. the required frames, are decompressed. The compressed frame is parsed into macroblocks by the header parser 36. The header parser 36 also separates the macroblocks into two portions: the header portion of the macroblocks that contain the motion compensation information, and the compressed block data structures. The compressed block data structure is decompressed in the block decoder module 50. The motion compensation information is used by the motion compensation engine 90 to get the prediction macroblock. These two steps are preferably performed concurrently, although, they may be performed in any order. The results of these two steps are summed. Preferably the parsing of each macroblock into two portions, obtaining the prediction macroblock by the motion compensation engine 90, and the summing is only performed for P and B frames. For I frames the motion compensation engine 90, and parts of the block decoder module 50 can be by-passed. The compressed frame is then stored in the memory 160, and then forwarded to the display generator 130. Using the techniques taught in co-pending U.S. patent application entitled "Reducing the Memory Required for Decompression by Storing Compressed Information Using DCT Based Techniques," by Jefferson E. Owen, and Jeyendran Balakrishnan Ser. No. 08/759,166 (Attorney's Docket No. 95-C-014) assigned to SGS-THOMSON Microelectronics, Inc., (hereinafter 95-C-014) incorporated herein by reference, the decompressed frames can be recompressed before storing them in the memory 160 to reduce the memory requirements.

Separating the decoder into distinct modules and functional blocks that can be performed in hardware or software allows connections to be made to the modules and functional blocks by more than one module or functional block. This provides the advantage of allowing the modules and functional blocks to be reused in other modules, reducing the circuitry need to perform the decompression of a compressed frame.

The detailed operation of the decoder 200 will now be described. In the present embodiment, a compressed frame is read into the FIFO 30, although any type of memory can be used as the buffer. The compressed frame is parsed into smaller subunits, in this embodiment macroblocks, by the header parser 36. In a different embodiment, the compressed image can be read into the FIFO in units lager than frames and the header parser 36 would parse that, until the image is broken down into macroblocks.

For P and B frames, the header parser 36 also separates the macroblocks into two portions: the header portion of the macroblocks that contain the motion compensation information and the compressed block data structures. The header portion of the macroblocks are sent to the motion compensation engine 90. The compressed block data structures are sent to the VLC decoder 42 of the block decoder module 50.

The block decoder module 50 decodes the data pixels and interpicture prediction errors. The VLC decoder 42 decodes the variable length codes representing the encoded blocks and converts them into fixed length PCM codes, representing the DCT coefficients comprising the encoded blocks, which are a serial representation of the 8×8 block array obtained in a zig-zag format. The IZZ 54 converts this serial representation to a rectangular 8×8 block array, and the result is passed to the inverse quantizer 48. The inverse quantizer 48 performs the inverse quantization based on the appropriate quantization tables. The inverse zig-zag scanning can be performed either before or after the inverse quantization, and the order of the IZZ 54 and the inverse quantizer 48 can be reversed with the inverse quantizer 48 coupled to the VLC decoder 42 and the IZZ 54 coupled to the IDCT circuit 66. The result is passed to the IDCT circuit 66. The IDCT circuit 66 performs the inverse DCT and produces the decompressed 8×8 block data structure in a rectangular array format.

The motion compensation engine 90 obtains the prediction macroblock. As mentioned above, the motion compensation information is the input of the address calculation circuit 96. The address calculation circuit 96 determines the type of prediction to be performed to determine which frames the motion compensation engine 90 will need to access. The address calculation circuit 96 uses the motion vectors and the type of frame being decoded to determine the address in memory 160 where the prediction frame, and the prediction macroblock, is located. The prediction macroblock is obtained from memory 160 and input into the half-pel filter 72. Typically there is a DMA engine 162 in the decoder that controls all of the interfaces with the memory 160. The half-pel filter 72 performs the horizontal and vertical half pixel interpolation on the prediction macroblocks.

The half pixel filtered prediction macroblocks obtained by the motion compensation engine 90, and the interpicture prediction errors, decoded by the block decoder module 50, are summed in the summing circuit 72 and passed to the assembly unit 102. Because in interpicture coding some frames require access to future frames to be decoded the required frames are typically sent by the encoder before the frame that requires them. The MPEG-2 standard uses interpicture prediction, and hence the compressed frames are not sent in the same order that they are displayed in the video sequence. The assembly unit 102 ensures that the information is placed in the correct place in memory to correspond to the frame being decompressed. The assembly unit is performed by proper address calculation, preferably in software, although it may be performed in a multiplexer.

The resulting decoded macroblock now needs to be stored in the memory 160 in the place designated for in by the assembly unit 102. All frames need to be stored in memory 160 because the decoded macroblock may not be the next macroblock that is to sent to the display due to the storing and transmission format of the decompression protocol. In MPEG-2 and other decompression protocols that use interpicture coding, the frames are encoded based on past and future frames, therefore in order to decode the frames properly the frames are not sent in order by the encoder and therefore need to be stored until they are to be displayed. Furthermore, I and P frames need to be stored so that they can be used to decode other frames.

I frames contain only intrapicture compression. Therefore, there is no motion compensation information in the header of I frame macroblocks and the motion compensation engine 90 can be omitted. The pixels in the block data structures of the I frame are decoded in the block decoder module 50 and the output 120 is the routed to the assembly unit 102. I frames can by-pass the motion compensation engine and the summing circuit. By-passing the motion compensation engine 90 and summing circuit provides the additional advantage that the time required to decompress an I-frame is reduced.

Figure 3:
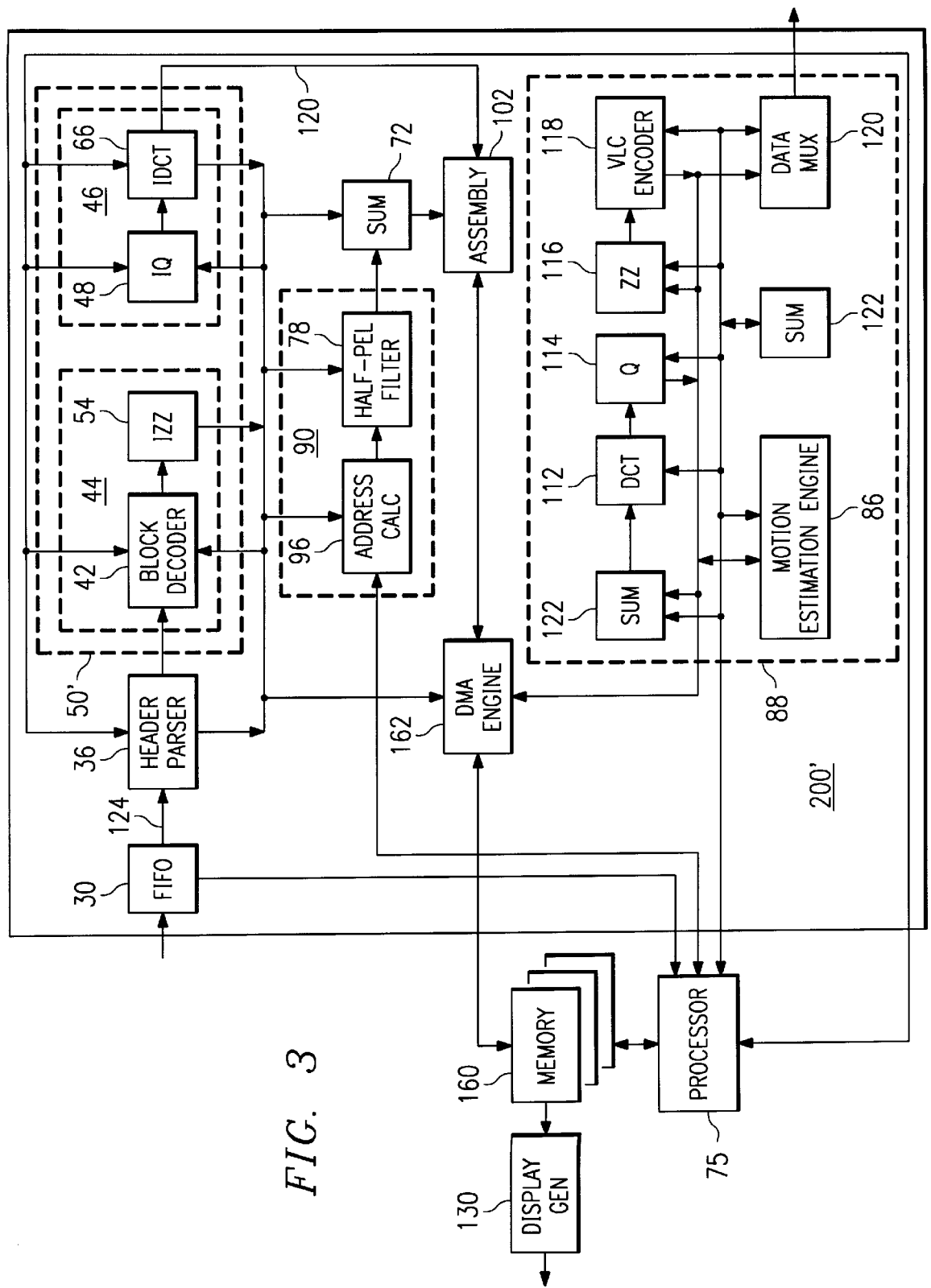
FIG. 3 is an electrical diagram, in block form, of the architecture of a decoder according to another embodiment of the invention.

The connections between the functional blocks that allow the functional block to be accessed by more than one functional block, to be by-passed and to be accessed in an order that differs from their physical location in the decoder can be made by multiplexers placed in appropriate locations, as shown in FIG. 2, or the connection between the functional blocks can be controlled by a processor, as shown in FIG. 3.

The decoder 200' like the decoder described above is a multi-standard decoder capable of decoding bitstreams formatted to comply to MPEG-1, MPEG-2, H.261, and H.263 and encoding a sequence to comply to the H.261 and H.263 standards. The decoder 200' is also composed of functional modules. Each one of the functional modules can be accessed by one or several of the other functional modules. The modules are connected to the memory 160 and the processor 75 to allow the processor 75 to control the access of the functional blocks. Typically there is a DMA engine 162 in the decoder 200' that controls all of the interfaces with the memory 160.

The decoder 200' contains a buffer, a FIFO 30, which like the FIFO found in the conventional decoder and is used to buffer the incoming compressed data as previously received compressed data is being decoded. The FIFO 30 is coupled to the header parser 36. The header parser 36 parses the encoded data into macroblocks and extracts the motion compensation information from the header of the macroblocks. The FIFO 30 is also coupled to the processor 75 to allow the compressed data to be parsed in the processor and the header parser 36 to be by-passed.

The header parser 36 is connected to the processor 75 and to the memory 160. The processor 75 is connected to the block decoder module 50', which, like the block decoder module 50, contains the block array decoder module 44 and the IDCT module 46. The block array decoder module 44 contains the VLC decoder 42 connected to the IZZ 54. The IDCT module 46 contains the inverse quantizer 48 coupled to the IDCT circuit 66. The processor 75 is coupled to the VLC decoder 42, the inverse quantizer 48, and the IDCT circuit 66. The block decoder module 50', as well as block array decoder module 44 and IDCT module 46 are shown in pipeline, however they can be configured in other forms as well. The block decoder module 50' decodes the pixels and interpicture prediction errors.

The second output of the header parser 36 is coupled to the address calculation circuit 96 of the motion compensation engine 90. The processor 75 is also coupled to the address calculation circuit 96. The motion compensation engine 90 contains an address calculation circuit 96 coupled to the half-pel filter 78. The motion compensation engine 90 obtains the prediction macroblocks.

The output of the block decoder module 50' and the motion compensation engine 90 is summed in the summing circuit 72. The output of the summing circuit 72 is coupled to the assembly unit 102, and the output of the assembly unit 102 is tied to the memory 160. The memory 160 is coupled to the half-pel filter 78 and the address calculation circuit 96 of the motion compensation engine 90. The memory is also coupled to the VLC decoder 42, IZZ 54, inverse quantizer 48 and IDCT circuit 66 of the block decoder circuit, as well as to the header parser 36 and the summing circuit 72.

The output of the assembly unit 102 is the output of the decoder 200'. The output of the decoder 200' is coupled to a display generator 130, typically through the memory 160. The decoder can also contain other blocks depending on the electronic system in which the decoder is designed to operate.

An encoder module 88' is coupled to the memory 160 and the processor 75, although the decoder 200' can operate without the encoder module 88'. The encoder module 88' should be added when it is decided that the decoder 200' be able to process sequences for video telephony.

The encoder module 88' operates contains the same circuitry as the encoder module 88 in FIG. 2, except the operations performed by the MUXs are performed by the processor 75.

The processor 75 allows some of the functional blocks of the decoder 200' to be performed in software in the processor 75 to either completely replace some or part of some of the functional blocks or to allow the function to be performed in either hardware or software. Completely replacing some or parts of some of the functional blocks that are not too exhaustive to be performed in software, such as the majority of the motion estimation block 86 for H.261 and H.263 allows for a saving in die space and reduces the cost of the system, while keeping the most exhaustive functional blocks in hardware so that they can be performed fast enough for the system to operate in real time.

In operation, the I or P frames needed to decompress the compressed frame are decompressed, i.e. the required frames. The compressed frame is parsed into macroblocks, which are separated in the header portions and the compressed block data structures by the header parser 36, by the processor, or by a combination of the processor and header parser 36, as will described in more detail below. The compressed block data structure is decompressed in the block decoder module 50'. The prediction macroblock is obtained by the motion compensation engine 90. These two steps are preferably performed concurrently, although, they may be performed in any order. The results of these two steps are summed. Preferably the parsing of each macroblock into two portions, obtaining the prediction macroblock by the motion compensation engine 90, and the summing is only performed for P and B frames, for I frames the motion compensation engine 90, and parts of the block decoder module 50' can be by-passed. The recompressed frame can be stored in the memory 160, and then forwarded to the display generator 130.

Separating the decoder into distinct modules and functional blocks of hardware or software allows connections to be made to the modules and functional blocks by more than one module or functional block. This allows the modules and functional blocks to be reused in other modules, reducing the circuitry need to perform the decompression of a compressed frame. Separating the decoder into functional blocks and connecting it to a processor allows some, or portions of some, of the functional block to be performed by the processor freeing up the hardware for other tasks, allowing the decoder 200' to perform more functions concurrently.

One embodiment of the detailed operation of the decoder 200' will now be described referring to FIG. 3 and FIG. 4A simultaneously. In the present embodiment, a compressed image frame is read into the FIFO 30, although any type of memory can be used as the buffer. The compressed frame is parsed into smaller subunits, in this embodiment macroblocks. For P and B frames, the macroblocks are separated into two portions: the header portion of the macroblocks that contain the motion compensation information, and the compressed block data structures. The header portion of the macroblocks are sent to the motion compensation engine 90. The compressed block data structures are sent to the VLC decoder 42 of the block decoder module 50'. The header parser 36 is composed of a frame header parser 37, which parses the frame into slices and separates quantization, and frame and motion compensation type information contained in the frame header, a slice header parser 38, which parses the slice into macroblocks, and a MBLK header parser 39 which separates the macroblock header from the block data structures. The header parser 36 is coupled to the processor 75, and some of the header parser's operation can be performed in the processor 75.

How much of the operation is performed in the processor 75 is based on balancing the processing capacity and speed of the processor 75 with the complexity and amount of processing required to perform the function as specified by the standard to which the encoded bitstream complies in real time. This applies to both the parsing operation and any other operation where it is desired to perform one or part of one of the functional blocks in the processor 75. For example, when the processor's processing capacity is at least at a capacity threshold and the speed of the processor is at least at a speed threshold where the capacity threshold and speed threshold of the processor together allow it to perform the entire operation of the header parser 36 fast enough to allow the decoder 200' to decoded the frame in the time between screen refreshes, typically $\frac{1}{30}$ of a second, the entire header parser 36 can be replaced by the processor. The FIFO 30 is also connected to the processor 75 and when the header parser 36 can be entirely replaced by the processor 75 the bitstream is sent to the processor 75 and not to the header parser 36. The determination of whether the processor's capacity and speed are above the capacity and speed thresholds for a particular standard is determined by software in the processor 75. The software should have access to which standard the bitstream complies, i.e. MPEG-2, H.263, etc., and the requirements of that standard, the time required by the decoder to decompress a frame complying to that standard, the memory requirement to perform the decompression, the memory available to the processor, and the capabilities of the processor.

This provides the advantage that the processor 75 frees up the hardware to perform other functions, such a encoding an uncompressed frame, or decoding another compressed frame concurrently with the compressed frame being decoded. This dynamic reconfiguration in the processor 75 of what parts of the decompression of a frame are performed in the processor 75 and what are performed in the decoder's hardware provide the advantage taking into effect any modification in the electronic system, such as replacement of the processor with a more powerful one or the addition of memory. It also provides the advantage of being able to accommodate future decoding standards that use most of the same functional blocks as the standards the decoder 200' is originally designed for. Both the former and later can be done with just a modification to the software. For a bitstream complying to a standards that requires less calculations such as H.261 or H.263 more of the decompression can take place in the processor 75 than for one complying to MPEG-1, and more decompression of a bitstream complying to MPEG-1 standard can take place in the processor 75 than for one complying to MPEG-2.

After a compressed frame is parsed the resulting data is stored in the memory 160. The block decoder module 50' decodes the data pixels and interpicture prediction errors. The VLC decoder 42 decodes the variable length codes representing the encoded blocks and converts them into fixed length PCM codes, representing the DCT coefficients comprising the encoded blocks, which are a serial representation of the 8×8 block array obtained in a zig-zag format. The IZZ 54 converts this serial representation to a rectangular 8×8 block array, and the result is passed to the inverse quantizer 48. The inverse quantizer 48 performs the inverse quantization based on the appropriate quantization tables. The result is passed to the IDCT circuit 66. The IDCT circuit 66 performs the inverse DCT and produces the decompressed 8×8 block data structure in a rectangular array format.

The motion compensation engine 90 obtains the prediction macroblock. As mentioned above, the motion compensation information is the input of the address calculation circuit 96. The address calculation circuit 96 determines the type of prediction to be performed to determine which frames the motion compensation engine 90 will need to access. The address calculation circuit 96 uses the motion vectors and the type of frame being decoded to determine the address in memory 160 where the prediction frame, and the prediction macroblock, is located. The prediction macroblock is obtained from memory 160 and input into the half-pel filter 72. Typically there is a DMA engine 162 in the decoder that controls all of the interfaces with the memory 160. The half-pel filter 72 performs the horizontal and vertical half pixel interpolation on the prediction macroblocks.

The half pixel filtered prediction macroblocks obtained by the motion compensation engine 90, and the interpicture prediction errors, decoded by the block decoder module 50' are summed in the summing circuit 72 and passed to the assembly unit 102. Because in interpicture coding some frames require access to future frames to be decoded the required frames are typically sent by the encoder before the frame that requires them. The MPEG-2 standard uses interpicture prediction, and hence the compressed frames are not sent in the same order that they are displayed in the video sequence. The assembly unit 102 ensures that the information is placed in the correct place in memory to correspond to the frame being decompressed. The assembly unit is performed by proper address calculation, preferably in software, although it may be performed in a multiplexer.

The resulting decoded macroblock now needs to be stored in the memory 160 in the place designated for in by the assembly unit 102. All frames need to be stored in memory 160 because the decoded macroblock may not be the next macroblock that is to be sent to the display due to the storing and transmission format of the decompression protocol. In MPEG-2 and other decompression protocols that use interpicture coding, the frames are encoded based on past and future frames, therefore in order to decode the frames properly the frames are not sent in order by the encoder and therefore need to be stored until they are to be displayed. Furthermore, I and P frames need to be stored so that they can be used to decode other frames.

I frames contain only intrapicture compression. Therefore, there is no motion compensation information in the header of I frame macroblocks and the motion compensation engine 90 can be omitted. The intrapicture compression is coded in the block decoder module 50' and the output 120 is routed to the assembly unit 102. I frames can by-pass the motion compensation engine and the summing circuit 72. By-passing the motion compensation engine 90 and summing circuit 72 provides the additional advantage that time to decompress an I-frame is reduced.

One embodiment of the operation of the encoder module 88 will be now be described referring to FIG. 3 and FIG. 4B simultaneously. Each incoming macroblock in a frame that can have motion compensation, such as a macroblock in P or B frame, is compared in the motion estimation engine 86 to macroblocks stored the buffer 126. The motion estimation can be performed by the decoder hardware or by the processor 75 in software, or preferably a combination of the two. The motion estimation module 86 compares the incoming macroblock with macroblocks in future and past frames to determine which macroblock, and in which frame, i.e. an I or P frame, one with which it has the most in common. The macroblock it has the most in common with is the prediction macroblock for this incoming macroblock. The motion estimation engine 86 determines the motion vectors between the incoming macroblock and the prediction macroblock. The motion vectors determined in the motion estimation engine 86 are stored in the memory 160. The motion compensation engine 90 gets the motion vectors and obtains the prediction macroblock, which is then stored in the memory 160.

The prediction macroblock is subtracted from the incoming macroblock in the summing circuit 110. For frames where there is no prediction marcoblock, such as when the frame is an I frame, the motion estimation engine 86 and the motion compensation engine 90 is by-passed and nothing is added to the pixels of the incoming macroblock. When there is a prediction macroblock, the pixels of the prediction macroblock are subtracted from the pixels of the incoming macroblock to obtain the prediction error pixels for the incoming macroblock. The DCT circuit performs a DCT on each 8×8 block of pixels in the input frame. The quantizer 114 quantizes the values based on the appropriate quantization tables, and the result is placed in the memory 160.

If the incoming macroblock can serve as a prediction marcoblock, such as macroblocks in I and P frames, the quantized prediction errors are sent to the IDCT module 46 so the incoming macroblock can be stored in a frame buffer 126 to be retrieved when it is a prediction macroblock for some other incoming macroblock.

The output of the IDCT module 46 and the output of the motion compensation engine 90 are summed in the summing circuit 122. The prediction macroblock is added in the sum circuit 122 to the prediction errors decoded by the IDCT circuit 66, when there is a prediction macroblock, to obtain the uncompressed incoming macroblock. The output of the summing circuit 122 is stored in the frame buffer 126. The macroblocks in the I and P frames are stored in the buffer 126 and retrieved when they are the prediction macroblocks needed for the comparison. The buffer 126 is connected to the motion estimation engine 86.

The output of the quantizer 114 is also converted to an 8×8 rectangular block array into a serial representation of it in a zig-zag format by the ZZ 116. The VLC encoder 118 then encodes the fixed length PCM codes that represent the DCT coefficients of the encoded blocks into VLC, typically using Huffman codes. This combined with header information, including the motion vectors, in the data MUX 120, forms the encoded bitstream. This encoded bitstream is the output of the data MUX 120, which is also the output of the encoder module 88. Preferably the ZZ 116 and inverse quantizer operate concurrently.

FIG. 5 shows one such application of decoder 200' in a computer 80. Computer 80 has an input device 73, an output device 74, a memory 160, and the decoder all coupled to a processor 75 through a bus 77. The decoder 200' can also be used in any other system that uses images, such as a DVD player, or television system.

Separating the decoder into distinct modules and functional blocks that can be performed in hardware or software allows connections to be made to the modules and functional blocks by more than one module or functional block. This allows the modules and functional blocks to be reused in other modules, reducing the circuitry needed to perform the decompression of a compressed frame. Additionally, in the preferred embodiment the I-frames by pass the motion compensation circuit 90 and the summing circuit 72, and therefore reduce the time for decompressing the compressed frame.

Furthermore, when the decoder is connected to a processor 75 it allows some, or parts of some, of the functional blocks to be performed in the processor 75. It provides the additional advantage of allowing the decoder to decompress more than one frame, either within the same bitstream or from two separate bitstreams, concurrently, since parts of the decompression of one some functions for one of the frames can be performed in software while the other frames is using the decoder's hardware to perform those functions. It also allows the decoder to decompress a compressed frame and compress a decompressed frame concurrently. This is particularly advantageous when the decompression standards to which the decoder encodes bitstreams to comply to are not equally complicated since more of bitstream with that complies to the less complicated standard can be decompressed in the processor. The dynamic reconfiguration in the processor of what parts of the decompression of a frame are performed in the processor and what are performed in the decoder's hardware provide the additional advantage taking into effect any modification in the electronic system, such as replacement of the processor with a more powerful one or the addition of memory, and the advantage of being able to accommodate future decoding standards that use most the of same functional blocks as the standards the decoder is originally designed for, all with just a modification to the software.

Further background on compression can be found in: International Organization for Standards, INFORMATION TECHNOLOGY—CODING OF MOVING PICTURES AND ASSOCIATED AUDIO FOR DIGITAL STORAGE MEDIA AT UP TO ABOUT 1.5 MBITS/S, Parts 1–6, International Organization for Standards; International Standards Organization, INFORMATION TECHNOLOGY—GENERIC CODING OF MOVING PICTURES AND ASSOCIATED AUDIO INFORMATION, Parts 1–4, International Organization for Standards; Datasheet "STi3500A" Datasheet of SGS-THOMSON Microelectronics; STi3500a—Advanced Information for an MPEG Audio/ MPEG-2 Video Integrated Decoder" (June 1995); Watkinson, John, COMPRESSION IN VIDEO AND AUDIO, Focal Press, 1995; Minoli, Daniel, VIDEO DIALTONE TECHNOLOGY, McGraw-Hill, Inc., 1995. Further background on computer architecture can be found in Anderson, Don and Tom Shanley, ISA SYSTEM ARCHITECTURE, 3rd ed., John Swindle ed., MindShare Inc., Addison-Wesley Publishing Co., 1995. All of the above references incorporated herein by reference.

Although the invention has been specifically described with reference to several preferred and alternative embodiments, it will be understood by those skilled in the art having reference to the current specification and drawings that various modifications may be made and further alternatives are possible without departing from the spirit and scope of the invention as set forth in the appended claims.

We claim:

1. A decoder for decompressing a compressed frame, the decoder coupled to a memory, the decoder comprising:

a parser, for parsing the compressed frame and separating motion compensation information and block data structures in the compressed frame having a first and second output;

a block decoder for decoding pixels and interpicture prediction errors in the block data structures, having an input coupled to the first output of the parser;

a motion compensation engine for obtaining a prediction macroblock using the motion compensation information, having an input coupled to the second output of the parser; and a summing circuit for summing the decoded interpicture prediction errors and the prediction macroblock, having a first input coupled to an output of the decoder module and a second input coupled to an output of the motion compensation engine.

2. The decoder of claim 1, further comprising an encoder including the motion compensation engine.

3. The decoder of claim 1, further comprising:

a processor including information on the processors speed and capacity, and information on the memory available to the processor, the processor programmable to determine whether the capacity and speed of the processor are above that needed to operate the decoder in real time and perform the by-passed modules by the processor for the compressed frame; and a third connector for by-passing the motion compensation engine and the summing circuit responsive to the capacity and speed of the processor being above that needed to operate the decoder in real time and perform the by-passed modules by the processor for the compressed frame.

4. The decoder of claim 1, wherein the decoder is capable of decoding a bitstream formatted to comply with the MPEG-2 standard.

5. The decoder of claim 1, wherein the motion compensation engine comprises:

an address calculation circuit for determining the type of prediction to be performed and the address in the memory of any required frames to decompress the compressed frame; and a half-pel filter for determining whether a subunit in the required frames correlates to a subunit of the compressed frame.

6. The decoder of claim 1, further comprising:

a processor including information on the processors speed and capacity, and information on the memory available to the processor, the processor programmable to determine whether the capacity and speed of the processor are above that needed to operate the decoder in real time and perform the by-passed modules by the processor for the compressed frame; and a first connector for by-passing portions of the block decoder and portions of the motion compensation engine responsive to the capacity and speed of the processor being above that needed to operate the decoder in real time and perform the by-passed modules by the processor for the compressed frame.

7. The decoder of claim 6, wherein the first connector comprises the processor.

8. The decoder of claim 1, further comprising:

a processor including information on the processors speed and capacity, and information on the memory available to the processor, the processor programmable to determine whether the capacity and speed of the processor are above that needed to operate the decoder in real time and perform the by-passed modules by the processor for the compressed frame; and a second connector for by-passing the parser responsive to the capacity and speed of the processor being above that needed to operate the decoder in real time and perform the by-passed modules by the processor for the compressed frame.

9. The decoder of claim 8, wherein the second connector comprises the processor.

10. The decoder of claim 1, wherein the block decoder comprises:

a block array module having an input coupled to the input of the block decoder; and an IDCT module having an input coupled to the block array and an output coupled to the output of the block decoder.

11. The decoder of claim 10, further comprising an encoder including the IDCT module.

12. The decoder of claim 10, wherein the block array module comprises:

a VLC decoder for decoding DCT coefficients of the block data structures, having an input coupled to the input of the decoder module; and an inverse zig-zag scanner for converting a serial representation of the block data structure into an array representation.

13. The decoder of claim 10, wherein the IDCT module comprises:

an inverse quantizer for performing an inverse quantization of the coefficients of the block data structure; and an inverse discrete cosine transform circuit for performing an inverse discrete cosine transform on the coefficients of the block data structure.

14. A decoder for decompressing a compressed frame, the decoder coupled to a memory and to a processor comprising:

a parser, for parsing the compressed frame and separating motion compensation information and block data structures in the compressed frame having a first and second output;

a block decoder for decoding pixels and interpicture prediction errors in the block data structures, having an input coupled to the first output of the parser having an IDCT module having an input coupled to the block array and an output coupled to the output of the block decoder;

a motion compensation engine for obtaining a prediction macroblock using the motion compensation information, having an input coupled to the second output of the parser; and a summing circuit for summing the decoded interpicture prediction errors and the prediction macroblock, having a first input coupled to an output of the decoder module and a second input coupled to an output of the motion compensation engine, and an encoder coupled to the memory, the encoder including the IDCT module.

15. The decoder of claim 14, further comprising an encoder including the motion compensation engine.

16. The decoder of claim 14, wherein the block decoder further comprises a block array module having:

a VLC decoder for decoding DCT coefficients of the block data structures, having an input coupled to the input of the decoder module; and an inverse zig-zag scanner for converting a serial representation of the block data structure into an array representation.

17. The decoder of claim 14, wherein the IDCT module comprises:

an inverse quantizer for performing an inverse quantization of the coefficients of the block data structure; and an inverse discrete cosine transform circuit for performing an inverse discrete cosine transform on the coefficients of the block data structure.

18. A decoder for decompressing a compressed frame, the decoder coupled to a memory and to a processor comprising:

a parser, for parsing the compressed frame and separating motion compensation information and block data structures in the compressed frame having a first and second output;

a block decoder for decoding pixels and interpicture prediction errors in the block data structures, having an input coupled to the first output of the parser having an IDCT module having an input coupled to the block array and an output coupled to the output of the block decoder;

a motion compensation engine for obtaining a prediction macroblock using the motion compensation information, having an input coupled to the second output of the parser;

a summing circuit for summing the decoded interpicture prediction errors and the prediction macroblock, having a first input coupled to an output of the decoder module and a second input coupled to an output of the motion compensation engine;

an encoder coupled to the memory, the encoder including the IDCT module; and an encoder including the motion compensation engine.

19. The decoder of claim 18, further comprising:

a processor including information on the processors speed and capacity, and information on the memory available to the processor, the processor programmable to determine whether the capacity and speed of the processor are above that needed to operate the decoder in real time and perform the by-passed modules by the processor for the compressed frame; and a third connector for by-passing the motion compensation engine and the summing circuit responsive to the capacity and speed of the processor being above that needed to operate the decoder in real time and perform the by-passed modules by the processor for the compressed frame.

20. The decoder of claim 18, wherein the motion estimation module comprises the processor.

21. The decoder of claim 18, wherein the decoder is capable of decoding a bitstream formatted to comply with the MPEG-2 standard.

22. The decoder of claim 18, wherein the block decoder further comprises a block array module having:

a VLC decoder for decoding DCT coefficients of the block data structures, having an input coupled to the input of the decoder module; and an inverse zig-zag scanner for converting a serial representation of the block data structure into an array representation.

23. The decoder of claim 18, wherein the IDCT module comprises:

an inverse quantizer for performing an inverse quantization of the coefficients of the block data structure; and an inverse discrete cosine transform circuit for performing an inverse discrete cosine transform on the coefficients of the block data structure.

24. The decoder of claim 18, wherein the motion compensation engine comprises:

an address calculation circuit for determining the type of prediction to be performed and the address in the memory of any required frames to decompress the compressed frame; and a half-pel filter for determining whether a subunit in the required frames correlates to a subunit of the compressed frame.

25. The decoder of claim 18, further comprising:

a processor including information on the processors speed and capacity, and information on the memory available to the processor, the processor programmable to determine whether the capacity and speed of the processor are above that needed to operate the decoder in real time and perform the by-passed modules by the processor for the compressed frame; and a first connector for by-passing portions of the block decoder and portions of the motion compensation engine responsive to the capacity and speed of the processor being above that needed to operate the decoder in real time and perform the by-passed modules by the processor for the compressed frame.

26. The decoder of claim 25, wherein the first connector comprises the processor.

27. The decoder of claim 18, further comprising:

a processor including information on the processors speed and capacity, and information on the memory available to the processor, the processor programmable to determine whether the capacity and speed of the processor are above that needed to operate the decoder in real time and perform the by-passed modules by the processor for the compressed frame; and a second connector for by-passing the parser responsive to the capacity and speed of the processor being above that needed to operate the decoder in real time and perform the by-passed modules by the processor for the compressed frame.

28. The decoder of claim 27, wherein the second connector comprises the processor.

29. A computer comprising:

an input device;

an output device;

a processor;

a memory; and, a decoder having:

a parser, for parsing the compressed frame and separating motion compensation information and block data structures in the compressed frame having a first and second output;

a block decoder for decoding pixels and interpicture prediction errors in the block data structures, having an input coupled to the first output of the parser having an IDCT module having an input coupled to the block array and an output coupled to the output of the block decoder;

a motion compensation engine for obtaining a prediction macroblock using the motion compensation information, having an input coupled to the second output of the parser; and a summing circuit for summing the decoded interpicture prediction errors and the prediction macroblock, having a first input coupled to an output of the decoder module and a second input coupled to an output of the motion compensation engine.

30. The decoder of claim 29, wherein the processor includes information on the processors speed and capacity, and information on the memory available to the processor, the processor programmable to determine whether the capacity and speed of the processor are above that needed to operate the decoder in real time and perform the by-passed modules by the processor for the compressed frame; and further comprising a first connector for by-passing portions of the block decoder and portions of the motion compensation engine responsive to the capacity and speed of the processor being above that needed to operate the decoder in real time and perform the by-passed modules by the processor for the compressed frame.

31. The computer of claim 29 wherein the IDCT module comprises:

an inverse quantizer for performing an inverse quantization of the coefficients of the block data structure; and an inverse discrete cosine transform circuit for performing an inverse discrete cosine transform on the coefficients of the block data structure.

32. The computer of claim 29, wherein the motion compensation engine comprises:

an address calculation circuit for determining the type of prediction to be performed and the address in the memory of any required frames to decompress the compressed frame; and a half-pel filter for determining whether a subunit in the required frames correlates to a subunit of the compressed frame.

33. A method for operating a decoder having access to a memory and to a processor, and having a block decoder, a motion compensation engine, a summing circuit having a first input coupled to an output of the block decoder and a second input coupled to an output of the motion compensation engine comprising the steps of:

decompressing the compressed frame in the block decoder; and responsive to the compressed frame comprising a frame including motion compensation prediction errors:

decompressing any frames needed to decompress the compressed frame to produce required decompressed frames;

supplying the required decompressed frames to the motion compensation engine;

determining the predicted frame in the motion compensation engine;

summing an output of the block decoder with an output of the motion compensation engine to obtain the decompressed frame;

determining a speed and processing capacity of the processor; and by-passing portions of the block decoder and portions of the motion compensation engine responsive to the processor having a capacity and speed above that needed to operate the decoder in real time and perform the by-passed modules by the processor for the compressed frame.

34. The method of claim 33, wherein the steps of decompressing the compressed frame in the block decoder and decompressing any frames needed to decompress the compressed frame to produce required decompressed frames are performed concurrently.

35. The method of claim 33, wherein the decoder further comprises an encoder, further comprising the step of compressing an uncompressed frame in the encoder.

36. The method of claim 33, wherein the decoder is capable of decoding a bitstream formatted to comply with the MPEG-2 standard.

37. The method of claim 33, further comprising the steps of:

parsing the compressed frame;

supplying the motion compensation information to the motion compensation engine, performed before the steps of decompressing the compressed frame in the motion compensation engine;

supplying the block data structures to the block decoder performed before the steps of decompressing the compressed frame in the block decoder.

38. The method of claim 37, wherein the step of parsing the compressed frame is performed by a parser having a first output coupled to the block decoder and a second output coupled to the motion compensation engine.

39. The method of claim 38, further comprising the steps of:

determining a speed and processing capacity of the processor; and by-passing the parser responsive to the capacity of the processor being at least a capacity threshold and the speed of the processor being at least a speed threshold; and performing the step of parsing the compressed frame by the processor responsive to by-passing the parser.

40. A computer comprising:

an input device;

an output device;

a processor;

a memory; and, a decoder having:

a parser, for parsing the compressed frame and separating motion compensation information and block data structures in the compressed frame having a first and second output;

a block decoder for decoding pixels and interpicture prediction errors in the block data structures, having an input coupled to the first output of the parser having an IDCT module having an input coupled to the block array and an output coupled to the output of the block decoder;

a motion compensation engine for obtaining a prediction macroblock using the motion compensation information, having an input coupled to the second output of the parser;

a summing circuit for summing the decoded interpicture prediction errors and the prediction macroblock, having a first input coupled to an output of the decoder module and a second input coupled to an output of the motion compensation engine;

wherein the processor includes information on the processors speed and capacity, and information on the memory available to the processor, the processor programmable to determine whether the capacity and speed of the processor are above that needed to operate the decoder in real time and perform the by-passed modules by the processor for the compressed frame; and a first connector for by-passing portions of the block decoder and portions of the motion compensation engine responsive to the capacity and speed of the processor being above that needed to operate the decoder in real time and perform the by-passed modules by the processor for the compressed frame.

41. The decoder of claim 40, wherein the first connector comprises the processor.

42. The computer of claim 40, wherein the processor includes information on the processors speed and capacity, and information on the memory available to the processor, the processor programmable to determine whether the capacity and speed of the processor are above that needed to operate the decoder in real time and perform the by-passed modules by the processor for the compressed frame; and further comprising a first connector for by-passing the motion compensation engine and the summing circuit responsive to the capacity and speed of the processor being above that needed to operate the decoder in real time and perform the by-passed modules by the processor for the compressed frame.

43. The computer of claim 40, wherein the decoder is capable of decoding a bitstream formatted to comply with the MPEG-2 standard.

44. The computer of claim 40, wherein the block decoder further comprises a block array module having:

a VLC decoder for decoding DCT coefficients of the block data structures, having an input coupled to the input of the decoder module; and an inverse zig-zag scanner for converting a serial representation of the block data structure into an array representation.

45. The computer of claim 40, wherein the IDCT module comprises:

an inverse quantizer for performing an inverse quantization of the coefficients of the block data structure; and an inverse discrete cosine transform circuit for performing an inverse discrete cosine transform on the coefficients of the block data structure.

46. The computer of claim 40, wherein the motion compensation engine comprises:

an address calculation circuit for determining the type of prediction to be performed and the address in the memory of any required frames to decompress the compressed frame; and a half-pel filter for determining whether a subunit in the required frames correlates to a subunit of the compressed frame.

47. The computer of claim 40, wherein the processor includes information on the processors speed and capacity, and information on the memory available to the processor, the processor programmable to determine whether the capacity and speed of the processor are above that needed to operate the decoder in real time and perform the by-passed modules by the processor for the compressed frame; and further comprising a second connector for by-passing the parser responsive to the capacity and speed of the processor being above that needed to operate the decoder in real time and perform the by-passed modules by the processor for the compressed frame.

48. The computer of claim 47, wherein the second connector comprises the processor.

49. The computer of claim 40, further comprising an encoder.

50. The computer of claim 49, wherein the encoder includes the IDCT module.

51. The decoder of claim 49, further comprising an encoder including the motion compensation engine.

* * * * *